United States Patent [19]

Shapiro et al.

[11] Patent Number: 4,661,948

[45] Date of Patent: Apr. 28, 1987

[54] DIGITAL QUADRATURE AMPLITUDE MODULATOR

[75] Inventors: Garry R. Shapiro, Los Gatos; Charles S. Meyer, Nevada City, both of Calif.

[73] Assignee: Fairchild Semiconductor Corporation, Cupertino, Calif.

[21] Appl. No.: 701,036

[22] Filed: Feb. 12, 1985

[51] Int. Cl.[4] .............................................. H04J 3/00
[52] U.S. Cl. ...................................... 370/77; 375/39; 332/21
[58] Field of Search ..................... 370/20, 77, 79, 80, 370/81, 82; 375/1, 14, 20, 24, 52, 53, 54, 39, 96; 332/16 R, 21, 23 R

[56] References Cited

U.S. PATENT DOCUMENTS

| | | | |
|---|---|---|---|
| 3,349,181 | 10/1967 | Ito | 370/77 |
| 3,793,588 | 2/1974 | Gerwen et al. | 375/60 |
| 3,985,961 | 10/1976 | Voss et al. | 370/82 |
| 4,347,616 | 8/1982 | Murakami | 375/39 |
| 4,455,649 | 6/1984 | Esteban et al. | 370/80 |
| 4,527,275 | 7/1985 | Russell | 375/1 |
| 4,550,416 | 10/1985 | Rosanes | 370/77 |

Primary Examiner—Robert L. Griffin
Assistant Examiner—Stephen Chin
Attorney, Agent, or Firm—Carl L. Silverman; James A. LaBarre; Frederick G. Michaud, Jr.

[57] ABSTRACT

In a quadrature amplitude modulator, two binary, synchronous data signals representing four possible phase states of a carrier signal are sampled and respectively fed into two shift registers comprising part of a finite impulse response lowpass filter. The samples in each corresponding pair of stages in the shift registers are multiplexed at twice the carrier frequency. Each multiplexer output is then added modulo-two to a binary signal at the carrier frequency using exclusive-OR gates. The gate outputs are weighted in a desired fashion and summed and converted to an analog signal which exhibits a preferred spectral shape. This approach enables the quadrature amplitude modulation function to be included within the structure of the finite impulse response lowpass filter. The binary synchronous nature of the input data enables the structure of the filter to be simplified and the number of multiplexers and modulo-two adders to be reduced to a number equal to the number of bits stored from the input sequences. An extension of this basic concept includes higher levels of encoding, specifically the case of sixteen or more possible phase and amplitude states of a carrier signal. The particular method for weighting and summing the multiplexed and modulated signals may utilize digital logic combined with resistors, switched capacitors, or a stored program combined with a digital-to-analog converter, and is suitable for integrated circuit fabrication.

20 Claims, 10 Drawing Figures

DIGITAL QUADRATURE AMPLITUDE MODULATOR

BACKGROUND OF THE INVENTION

The present invention is directed to the modulation of a carrier signal with plural data streams, and more particularly is concerned with quadrature amplitude modulation using digitally encoded data.

One particular application of the present invention relates to the transmission of data over telephone lines by means of modems (modulators/demodulators). Typically, a full duplex modem that offers simultaneous two-way communication at a rate of 1200 bits per second operates in a channel that has about 2 kHz of available useful bandwidth. This bandwidth is insufficient for modulation methods that utilize binary encoding, which encodes one bit of data per signal element, or symbol, and which requires 1 Hz per bit per second for each direction of communication. Accordingly, it becomes necessary to encode more than one bit of information per symbol in order to reduce the apparent data rate and thereby utilize the available channel bandwidth more efficiently. To this end, two bits of digital information are encoded per symbol, so that each symbol represents a unit of information known as a dibit having four possible states. Therefore, an input data rate of 1200 bits per second is transmitted at a symbol rate of 600 baud, i.e., 600 symbols per second, and requires approximately only half the bandwidth of binary signalling.

Various amplitude, frequency and phase modulation techniques have been proposed for dibit signalling. One such technique, and the one to which the present invention is directed, is known as Quadrature Amplitude Modulation. Basically, Quadrature Amplitude Modulation (QAM) is a general term for the simultaneous generation of two suppressed-carrier AM signals whose carriers differ in phase by 90°. A conventional QAM modulator is illustrated in block form in FIG. 1. It comprises two identical filters 10 and 12 that spectrally shape the two baseband data streams $\{a_n\}$ and $\{b_n\}$, respectively. The spectrally shaped signals are used to modulate two periodic, zero-mean quadrature functions of equal amplitude (e.g. sin $\omega_c t$ and cos $\omega_c t$) in a pair of multipliers 14 and 16. The modulated signals are summed in a summer 18 and the resultant signal is presented to a post-modulation filter 20 that can be used for harmonic suppression and equalization.

In the general case where the two input voltages $a_n$ and $b_n$ are independent and continuous signals with maximum values of ±1, the vector that results after their summation could have any magnitude from 0 to 1 and any phase angle. In the special case where the input signals are binary, synchronous non-return-to-zero signals having a value of +1 or −1, the resultant vector assumes one of four possible steady state values of equal amplitude and a phase angle of 45, 135, 225 or 315°. This special case of modulation is called 4-state Quadrature Amplitude Modulation (4-QAM), or, alternatively, Quadrature Phase Shift Keying (QPSK).

In practical applications, the performance of a conventional QAM modulator of the type shown in FIG. 1 is limited. This limitation stems primarily from the fact that a high degree of tracking and symmetry is required of the two analog filters and the suppressed carrier modulators, i.e., they should be ideally matched. This requirement results in the need for complex filters. However, the inability to perfectly match the components in each leg of the modulator, as well as d.c. offset voltages that may be present in the baseband data signals, result in unsuppressed carrier and sideband components. Typically, discrete modulators for baseband modem applications, of the type shown in FIG. 1, have about 34–40 dB carrier suppression and about 40 dB unwanted side-band suppression.

As an alternative to the analog QAM modulator illustrated in FIG. 1, QPSK signals can also be directly generated by digital techniques. One example of such a technique for generating a QPSK signal is disclosed in U.S. Pat. No. 4,049,909. However, techniques such as those shown in the patent typically offer limited flexibility in shaping the resultant frequency spectrum. Accordingly, they may require stringent post-modulation bandpass filtering.

OBJECTS AND BRIEF STATEMENT OF THE INVENTION

Accordingly, it is a general object of the present invention to provide a novel QAM modulator that does not require multiple matched components and therefore has reduced complexity while providing adjacent channel projection.

It is another object of the present invention to provide a novel QAM modulator that utilizes only a single filter structure which affords arbitrary passband and stopband characteristics.

It is a further object of the present invention to provide a noval QAM modulator that is suitable for integrated circuit fabrication.

It is yet another object of the present invention to provide a novel QAM modulator that offers superior performance with regard to suppression of undesired carrier, sideband and harmonic signals.

Briefly, in accordance with the present invention, these objects and their attendant advantages are achieved by incorporating the modulation function within the structure of the spectral shaping filter in order to digitize the modulation function and enable a single filter to be used. The use of the same filter for both input data streams provides inherent symmetry and thereby obviates the need for matched components. In operation, the two input data signals are sampled and respectively fed into shift registers comprising part of a finite impulse response filter. Quadrature modulation is achieved by multiplexing the shift registers at twice the carrier frequency, and then modulo-two adding the multiplexed signals to a binary signal at the carrier frequency through exclusive-OR gates. The resulting quadrature modulated signals are then weighted in accordance with a desired spectrum, summed and converted to an analog form to provide a signal that is suitable for transmission.

Further features of the invention, and the advantages offered thereby, are described in detail hereinafter with reference to preferred embodiments of the invention illustrated in the accompanying drawings.

DESCRIPTION OF THE ILLUSTRATED EMBODIMENTS

In the following detailed description of preferred embodiments of the invention, particular reference is made to the use of the invention in connection with single sideband suppressed carrier communications, where the modulating signals can be audio signals in phase quadrature. However, it will be appreciated by those having familiarity with this technology that the practical applications of the invention are not so limited. For example, the invention can also find utility in color TV transmissions, where the modulating signals can be two color difference signals.

Figure 2:
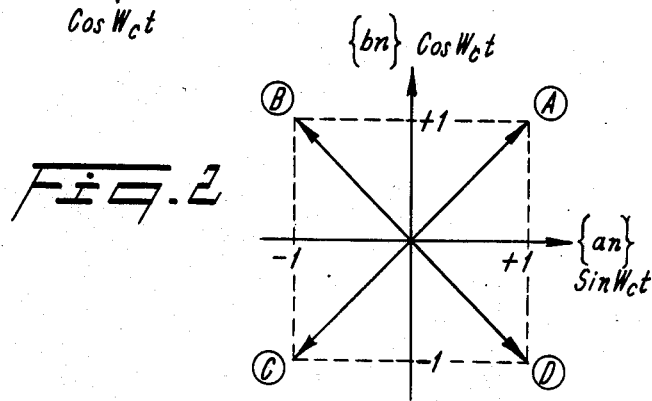
FIG. 2 is a phasor diagram illustrating the relationship of the four data points in a quadrature phase shift keyed signal.

One particular embodiment of the invention will now be described with specific reference to quadrature phase shift keying utilizing dibit data symbols. As noted previously, in this situation each dibit contains information regarding one bit in each of the two data signals, so that four different dibits, represented as 00, 01, 11, and 10, are possible. A phase diagram representing the four vectors that result from these four possible states is illustrated in FIG. 2. As shown therein, each vector has a unit amplitude and a phase angle of 45, 135, 225 or 315°. Since an analog telephone network is designed for voice communications, a system-wide timing reference does not exist for determining the absolute phase of each received signal. Accordingly, the four dibit values are encoded on a carrier signal as phase differences relative to the current carrier phase. The four different dibit values therefore are represented as phase steps of +90, 0, -90 and 180°.

Figure 3:
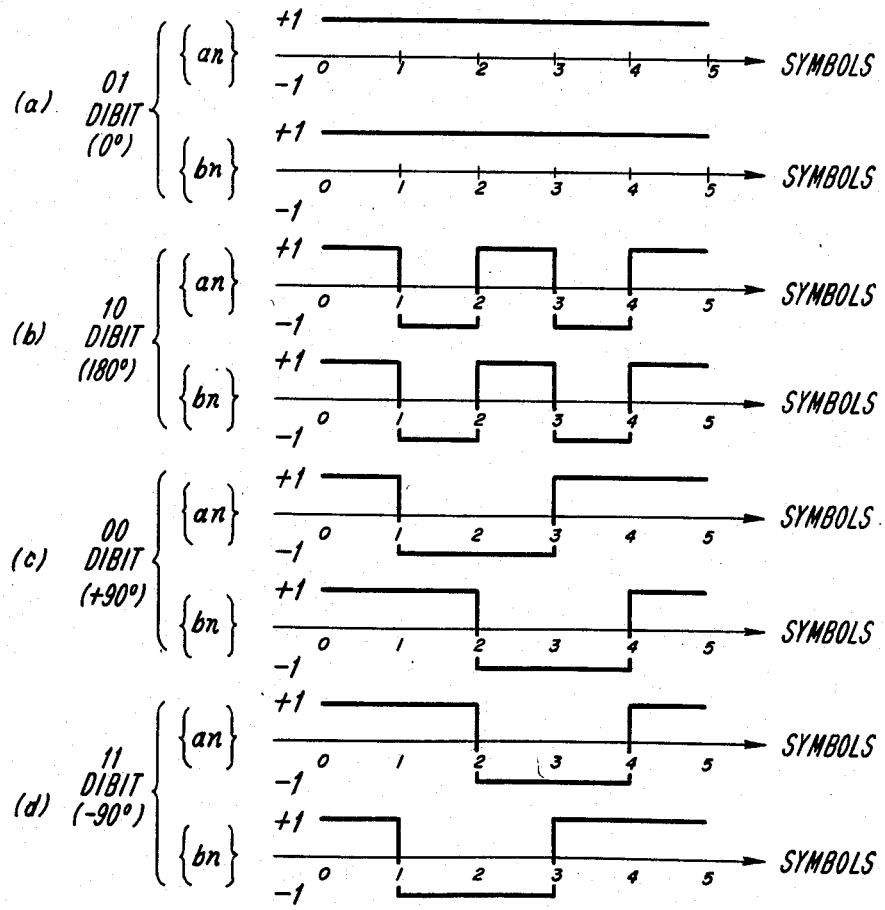
FIG. 3 is a timing diagram illustrating the sequences of the two binary synchronous signals for four continuously repeated dibit sequences.

Numerous formats for encoding the dibit information on a carrier signal are available. One useful relationship of the two input data signals to encode each of the four dibit sequences, with each sequence being continuously repeated, is illustrated in the timing diagram of FIG. 3. For convenience, it is assumed that in the current state the phasor is at point A in the diagram of FIG. 2. In FIG. 3a, the 01 dibit, which is represented in this example by a 0° change in phase, is depicted. In this case, the two input signals $a_n$ and $b_n$ do not change, so that the phasor remains at point A. The 10 dibit is represented in this instance by a 180° change in phase. In this case, both $a_n$ and $b_n$ change at each symbol time, and the phasor alternates between points A and C. The 00 dibit is represented in the example by a +90° change in phase. The $a_n$ and $b_n$ input signals change alternately as shown. The phasor thus moves from point A to points B, C, D, A etc., thereby gaining 360°, i.e., 1 carrier cycle, every four symbols. For the 11 dibit, represented in this instance by a -90° phase change, the $a_n$ and $b_n$ input signals also change alternately but in opposite sequence to the 00 dibit. Therefore, the phasor moves from point A to points D, C, B, A, etc., losing 360° every four symbols.

In the preferred embodiment of the present invention, the spectral shaping of the input data signals to generate a band-limited sinx/x spectrum, or some other desirable spectrum suitable for data transmission, is carried out by means of a Finite Impulse Response (FIR) filter. This type of filter is desirable, among other reasons, because of its ability to realize a linear-phase transfer function.

Figure 1:
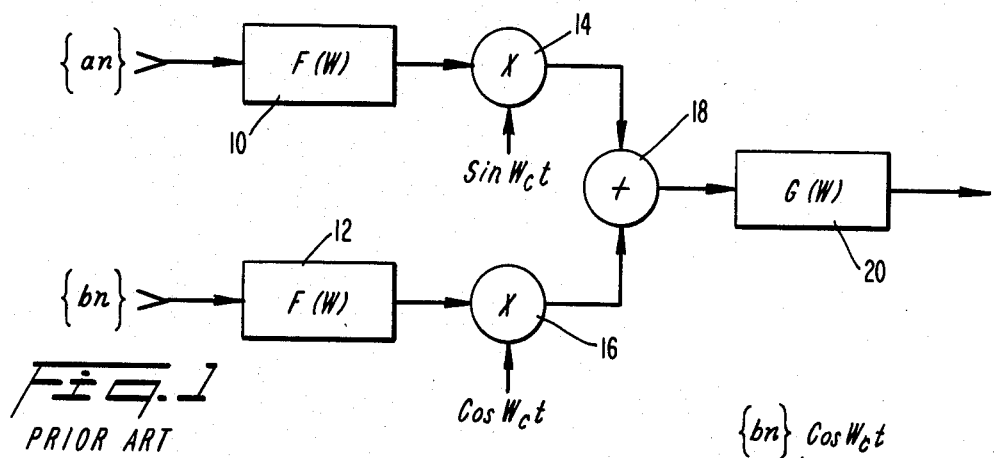
FIG. 1 is a block diagram depicting a conventional QAM modulator.
Figure 4:
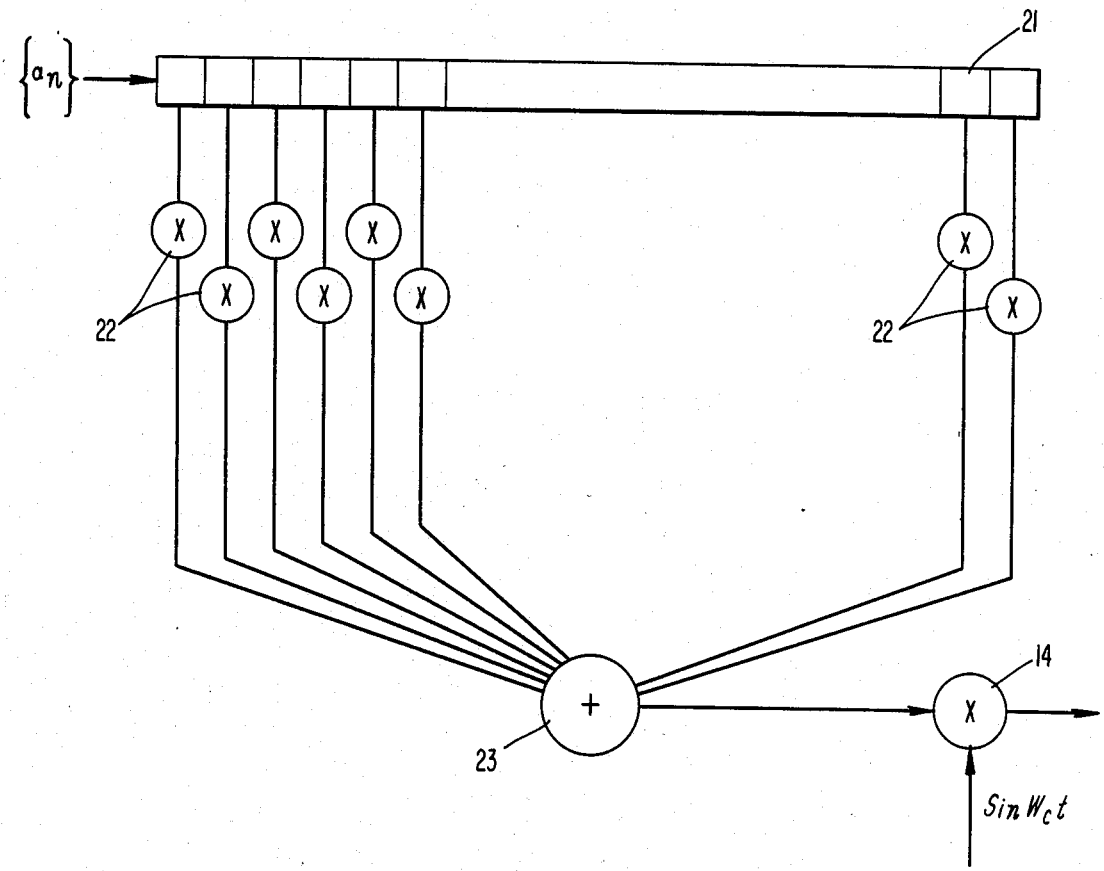
FIG. 4 is a schematic diagram of the general configuration of a finite-impulse response filter.

The general construction of such a filter is illustrated in FIG. 4. It basically comprises a delay line, e.g. a shift register 21, each stage of which is connected to a coefficient multiplier tap 22. The output signals from all of the taps are combined in a summer 23. The filter output signal resulting from the summation of all these signals is presented to a multiplier, such as the multiplier 14 or 16 of FIG. 1, where it is modulated onto a carrier wave signal. In operation, successive samples of the input data stream $\{a_n\}$ are taken at a suitable sampling rate, e.g. 9600 Hz, and clocked through the stages of the shift register 21. During each clock cycle, each sample is weighted in one of the taps 22 by a coefficient determined by the desired transfer function for the filter. The weighted samples are then summed to provide an analog signal having the desired output spectrum. When the coefficient multipliers applied to the taps are symmetrical about the center tap, the response of the filter is linear phase.

Where the input signal $\{a_n\}$ is binary and synchronous, i.e., the signal remains constant during each symbol interval, it is only necessary to sample the signal once per symbol interval in order to obtain all of the information about the signal during that interval. This characteristic of the signal can be exploited to simplify the structure of the filter. More particularly, when only one sample per symbol is taken, only one register tap per symbol will be active at any instant in time and all other taps will be zero. In other words, for N=mn where N=the number of taps, m=the number of symbols in the finite impulse response, and n=the number of taps per symbol, only m taps need to be examined at any instant.

Figure 5:
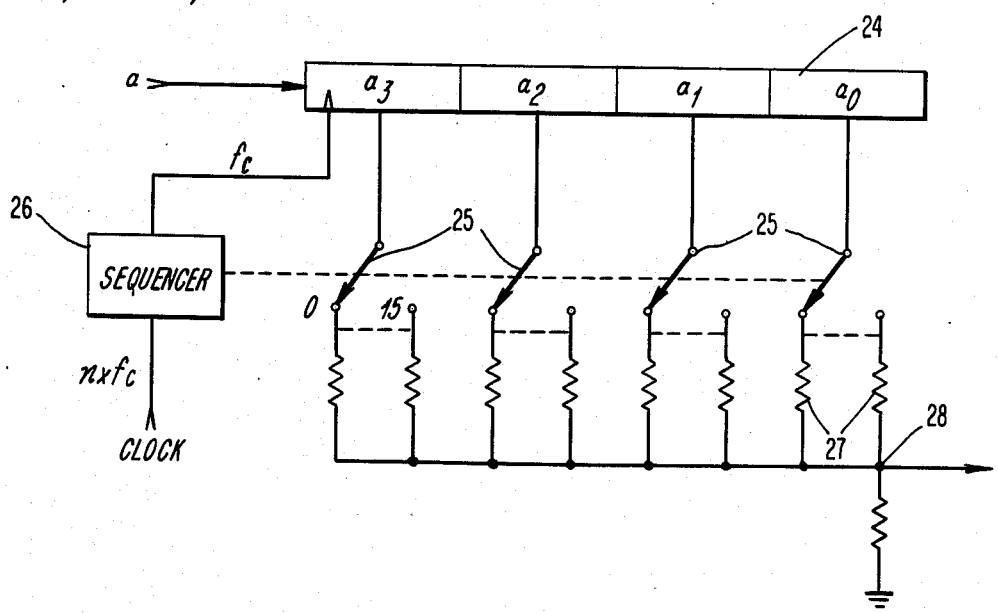
FIG. 5 is a partial schematic and partial block circuit diagram of a simplified finite impulse response filter that can be employed with binary synchronous input sequences.

An example of a simplified filter, incorporating the foregoing principle, is illustrated in FIG. 5. For purposes of illustration, in the illustrated example the number of symbols, m, in the finite impulse response is 4. It will be appreciated that the actual number that is chosen for any particular application will be determined by the dynamic range of the weighting taps. Since the magnitude of the impulse response for the filter decreases with increasing distance from the tap having the maximum weighting value, e.g. the center tap, after a certain number of symbols the magnitude of the response becomes so small that it cannot be resolved. For example, where the realizable ratio of the largest to the smallest weighting factor is 50:1 in a structure having 65 taps, a suitable choice for m is 4.

Referring to FIG. 5, the four most recent bits, $a_0$-$a_3$, in the input data signal are clocked into the four stages of an m-stage shift register 24 at the symbol rate, e.g. 600 Hz. The values stored in each stage of the shift register are respectively applied as d.c. levels to the input terminals of four ganged switches 25. These switches are controlled by means of a sequencer 26 to sequentially connect the output signal from each stage of the register to each of the n taps per symbol. In the illustrated embodiment, n=16, so that the total number of taps $N=n \times m=64$. Each tap is weighted by a resistor 27 or other suitable means to provide the desired spectral shaping. Thus, for example, if a sinx/x spectrum, or some other symmetrical spectrum, is desired, the center tap, or taps, would have the maximum resistor value, and the values of the other resistors would be successively less with increasing distance from the center taps, in accordance with a weighting function that synthesizes a truncated transfer function.

The rate at which the switches 25 are actuated is an integer multiple of the input data rate, so that each of the n taps samples the symbol during each symbol interval of the input data signal. When each tap is active once per input data cycle, the resultant input spectrum is approximately flat and the necessary transfer function approximately equals the desired output spectrum, as well as being smooth and monotonic in the passband. Thus, in the illustrated embodiment, the switches are actuated at a frequency 16 times the input data rate. The weighted signal from each of the four symbols are then summed at a junction 28 to provide an analog, spectrally shaped signal.

In conventional 4-QAM modulators, this spectrally shaped signal is presented to a multiplier 14 to modulate the carrier signal as shown in FIG. 4. This modulated signal is then summed with another signal that has been similarly shaped and modulated to provide the resultant quadrature output signal. However, in accordance with the present invention, the square-wave nature of the carrier signal is utilized to incorporate the quadrature modulation function within the structure of the filter itself, to thereby eliminate the need for two separate but matched filters and modulators. More particularly, the signal appearing at the output terminal of the multiplier 14 in the circuit of FIG. 4 is the product of the carrier signal times the sum of the weighted tap signals, i.e. $c(a_0' + a_1' + a_2' + \ldots + a_{m-1}')$, where c is the magnitude of the carrier signal and $a_0', a_1', a_2'$, etc. are the weighted tap signals. Algebraically speaking, however, this result is equivalent to the sum of the individual products, i.e. $ca_0' + ca_1' + ca_2' + \ldots ca_{m-1}'$. Accordingly, the multiplication (modulating) step can be carried out before the individual weighted tap signals are summed and still provide the same results. Furthermore, by modulating both of the input sequences together, only one filter need be utilized.

Figure 6:
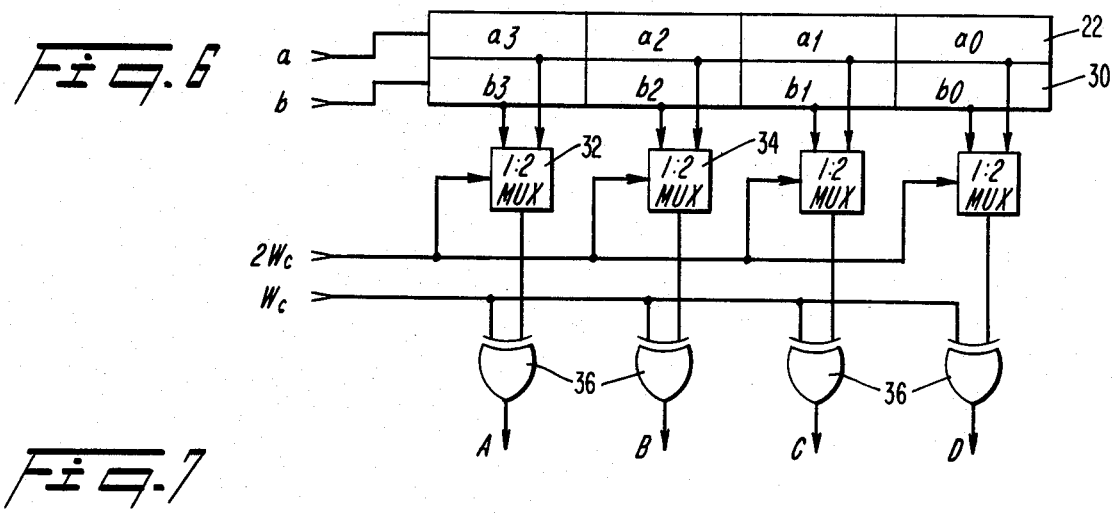
FIG. 6 is a block diagram of the modulation circuit for a 4-QAM modulator.

A modulation circuit which operates in accordance with this principle is illutrated in FIG. 6. Referring thereto, the bits in one of the input data signals are fed into one shift register 24 and those of the other data signal are fed into a similar shift register 30. The output terminals of each corresponding stage in the two shift registers 24 and 30 are respectively connected to the two input terminals of a one-of-two multiplexer. Thus, the most recent bit of each of the two data signals are supplied to a multiplexer 32, the second most recent bit of each of the two data signals are supplied to a second multiplexer 34, and so on. These multiplexers are clocked at twice the frequency of the carrier signal. The effect of multiplexing the two input data signals in this manner is equivalent to chopping each symbol with a unipolar square wave, with the in-phase and quadrature symbols being selected on opposite phases. This situation is depicted in the timing diagrams of FIGS. 7a and 7b for the case where each of the samples in the shift registers are binary ones. The output signal from each multiplexer is a replication of the baseband spectrum around a center frequency equal to two times the carrier frequency and the odd harmonics thereof. Since the two symbols are selected on opposite phases of the multiplexing clock signal, both spectra are present and on opposite phases.

Figure 7:
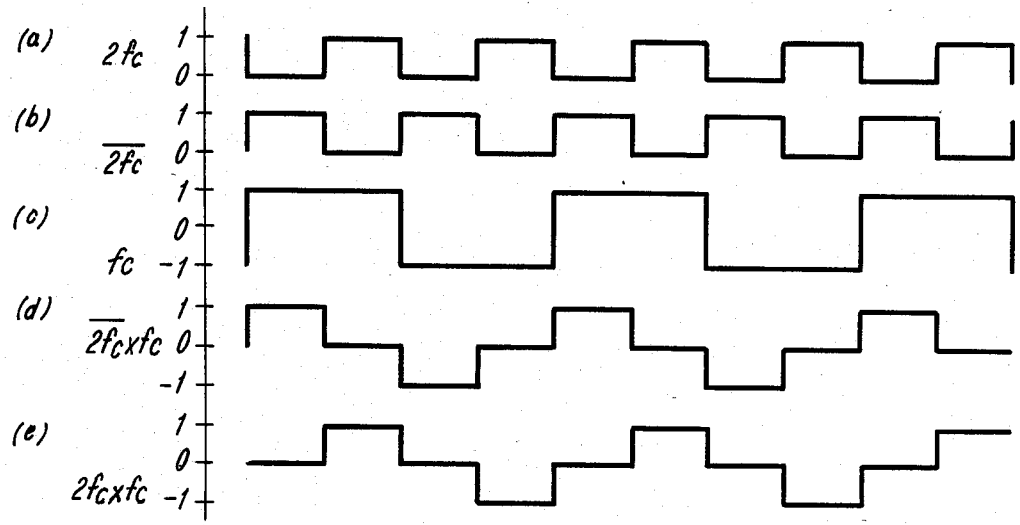
FIG. 7 is a timing diagram illustrating the relationship of the signals in the circuit of FIG. 6.

This complex spectrum is multiplied by a symmetric square wave carrier, depicted in FIG. 7c. The multiplication is carried out by means of exclusive-OR gates 36. Each OR gate receives the output signal from one of the multiplexers 32, 34, etc. at one input terminal and the square wave carrier frequency signal at its other input terminal. The effect of this multiplication is to translate the above-mentioned even-order spectral components, containing multiplexed baseband signals on opposite phases, to odd-order spectral components containing multiplexed signals in quadrature, i.e. odd multiples of 90°. Thus, as can be seen from FIGS. 7d and 7e, the products of the chopped waveforms and the square wave carrier are in quadrature.

Figure 8:
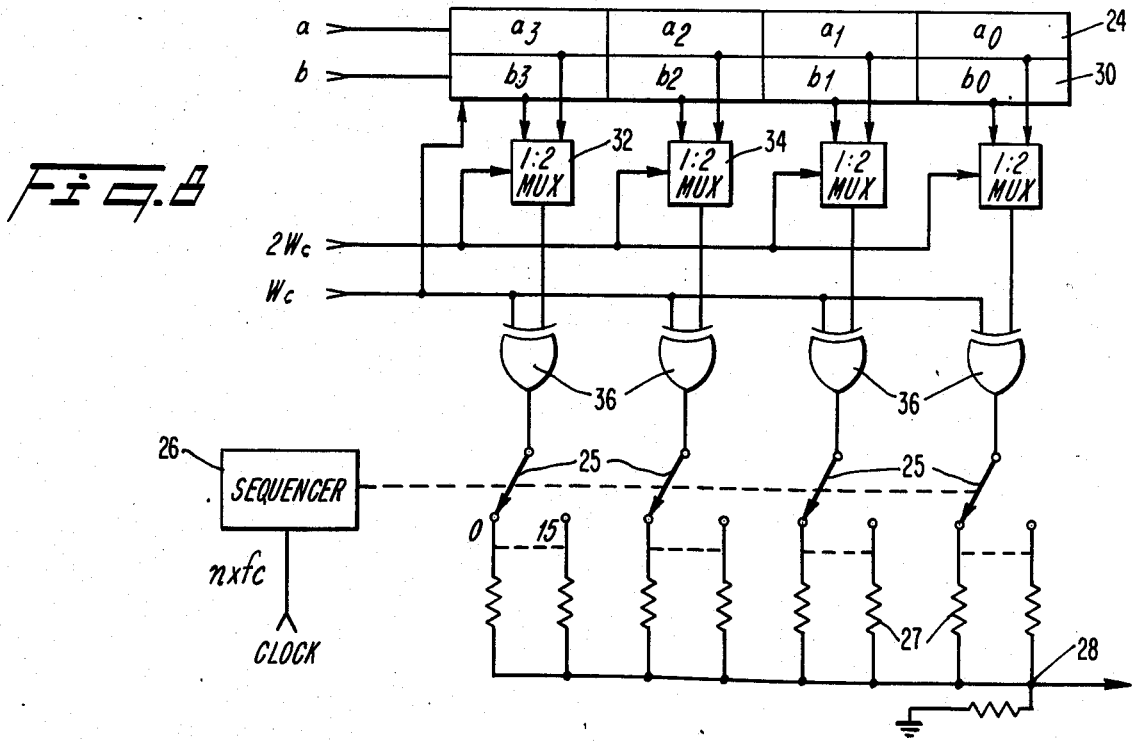
FIG. 8 is a schematic and block diagram of the 4-QAM modulator circuit resulting from the incorporation of the modulation circuit of FIG. 6 into the filter structure of FIG. 5.

The individual quadrature modulated signals appearing at the output terminals of the exclusive-OR gates 36 can be weighted in accordance with a desired transfer function to produce the appropriate output spectrum. For example, these signals can be applied as input signals to the tap switches 25 of the FIR filter, as illustrated in FIG. 8. The incorporation of the modulation function within the structure of the filter in this manner provides inherent symmetry which affords good carrier suppression and unwanted sideband suppression.

Figure 9:
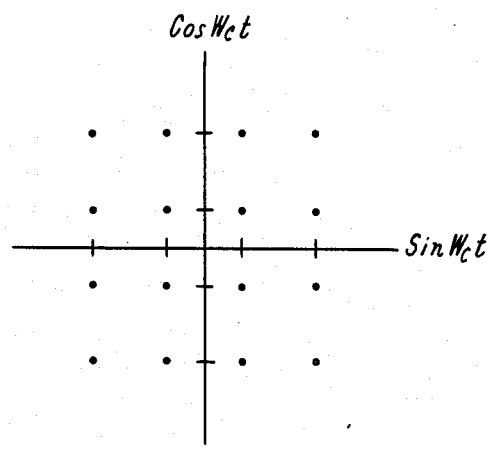
FIG. 9 is a phasor diagram for the situation in which four bits are encoded per signal symbol.

While a preferred embodiment of the invention has been specifically described with respect to the dibit encoding of data where amplitude remains constant, it will be appreciated that the principles underlying the invention are equally applicable to more general coding schemes. For example, each element of the input sequences could comprise four discrete signal levels and thus contain two bits of information. These may be encoded so that one of the bits can be termed an amplitude bit and the other labelled a sign bit. When two input sequences are combined, four bits of information are transmitted in each symbol interval, and the available data would thus be represented by a steady-state constellation of 16 data points arranged as shown in FIG. 9 for maximum separation and noise immunity.

Figure 10:
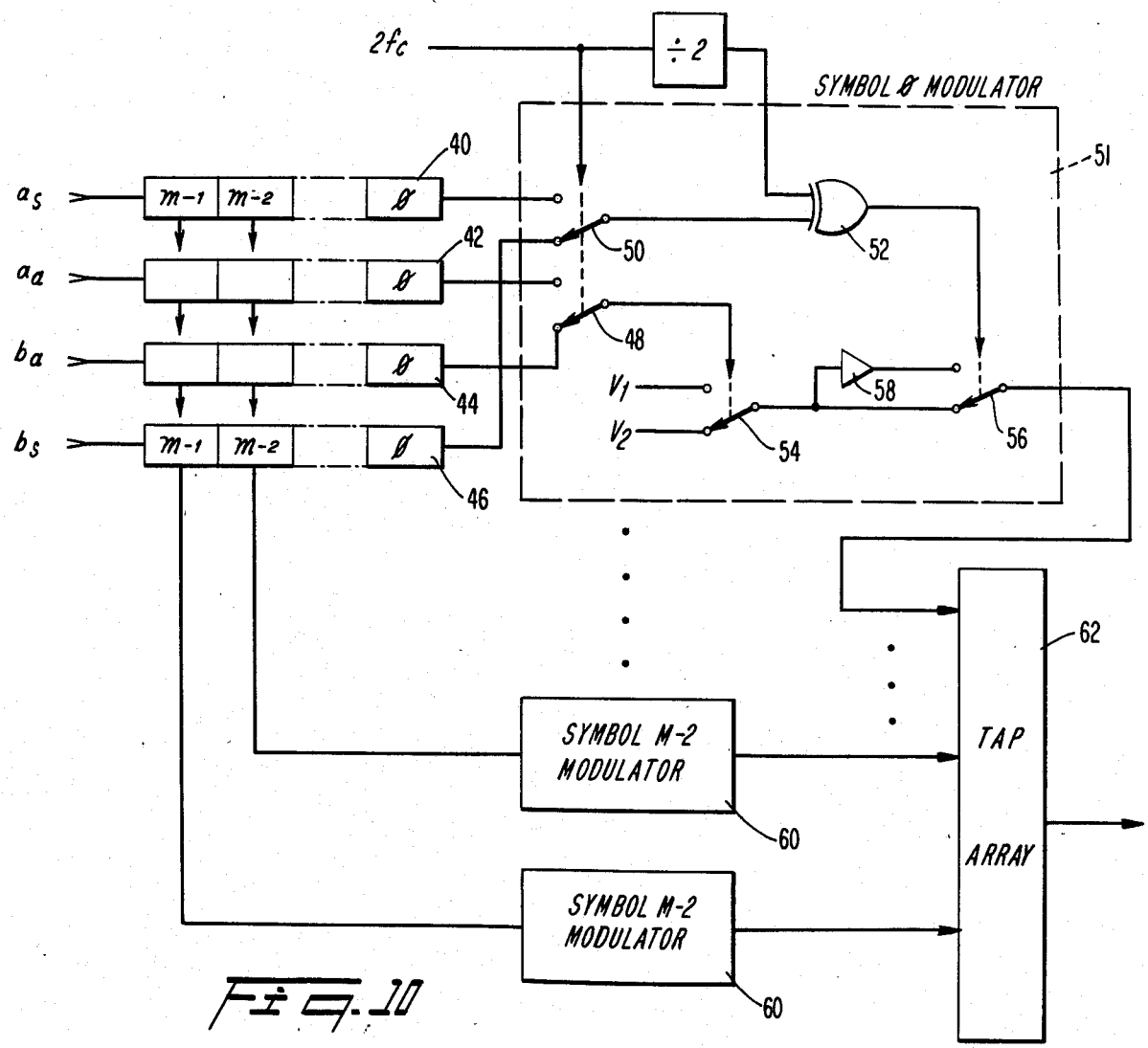
FIG. 10 is a block circuit diagram of a 16-QAM modulator.

A 16-QAM modulator for processing this type of data in accordance with the present invention is shown in FIG. 10. In this circuit, the amplitude bits $a_a$, $b_a$ and the sign bits $a_s$, $b_s$ for each of the two input sequences a and b are respectively fed into four m-stage shift registers 40–46. Referring to the stage of each register which stores the earliest bit of each sequence (labeled zero in FIG. 10), the two amplitude bits are respectively fed to the input terminals of a 1-of-2 multiplexer 48 in a modulator circuit 51 and the two sign bits are similarly fed to a multiplexer 50. These multiplexers are actuated at a rate equal to two times the carrier frequency. The multiplexed sign bits are fed to an exclusive-OR gate 52 where they are modulo-2 added to a square wave at the carrier frequency, as in the 4-QAM modulator. The multiplexed amplitude information is used to control a switch 54 which is selectively connected to one of two different voltage sources $V_1$ and $V_2$. The voltage level selected by the switch 54 is directly applied to one input terminal of a 1-of-2 selection circuit 56, and applied to another input terminal of the selection circuit through an inverter 58. The selection circuit is controlled by the output signal from the exclusive-OR gate 52. Thus, the signal appearing at the output terminal of the selection circuit 56, which also comprises the output signal for the modulator circuit 51, has voltage level, $V_1$ or $V_2$, selected by the amplitude bit and a polarity determined by the sign bit.

The other stages of the shift registers 40-46 are connected to similar modulator circuits 60. The output signals from these circuits are applied to a commutating tap array 62 having m symbol inputs, where they are spectrally shaped and combined to form a signal suitable for transmission.

In the foregoing description of the FIR filter, reference was made to the use of resistors to weight the various taps in order to facilitate an understanding of the filter and its operation. However, it will be appreciated that the filter can also be constructed using a summing switched capacitor integrator, as described, for example, by Reddy et al, "Switched-Capacitor Realization of FIR Filters", IEEE Trans. Circuits and Systems, Vol. CAS-31, April 1984, pp. 417-419. This form of filter is more suitable for the implementation of the modulator in integrated circuits.

Further in this regard, while the preferred embodiments of the invention have been described in a hard-wired form, the basic operating principles which underly the invention could also be implemented with a program-controlled microprocessor. More particularly, each bit of data in the input streams is examined to determine whether it is +1, 0 or −1. For all non-zero bits, logical operations equivalent to those performed by the multipliers 32, 34 and the exclusive-OR gates 36 of the circuit in FIG. 6 are carried out to produce digital, modulated bits having values of +1 or −1. Each of these bits are then weighted, for example with reference to values stored in a look-up table, and digitally summed with all other non-zero samples. The value that results from the summation can then be fed to any suitable digital-to-analog converter to produce the desired signal for transmission. Depending on the resolution of the D-A converter, such an approach may provide a greater dynamic range than that which can be practically realized using switched capacitor or resistor weighting.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for quadrature amplitude modulation of a carrier signal with plural binary synchronous sequences, comprising the steps of:
   storing at least one bit of each of the binary synchronous sequences;
   multiplexing the stored bits at a frequency that is an integer multiple of the frequency of the carrier signal to produce a multiplexed multibit signal;
   modulating a square wave signal having a frequency equal to that of the carrier frequency of the quadrature amplitude modulation with the multiplexed multibit signal; and
   spectrally shaping the modulated square wave signal to generate a quadrature-amplitude-modulated analog signal.

2. The method of claim 1 wherein said step of modulating the square wave signal comprises modulo-2 addition of the square wave signal and the multiplexed multibit signal.

3. The method of claim 1 wherein plural successive bits of each of said binary synchronous sequences are simultaneously stored and multiplexed to produce plural multiplexed multibit signals, and wherein said plural multiplexed signals are simultaneously modulated with said square wave signal to produce plural modulated signals that are filtered to generate said modulated analog signal.

4. The method of claim 3 wherein said filtering step comprises the steps of taking multiple samples of each modulated signal during each cycle of said square wave signal, weighting each sample in accordance with a desired output spectrum, and summing the weighted sample from each modulated signal to generate said modulated analog signal.

5. The method of claim 1 wherein said stored bits are multiplexed at a freqeuency that is twice the frequency of the carrier signal.

6. A modulator for generating a quadrature phase-shift keyed signal from two binary synchronous sequences, comprising:
   means for storing data elements of each of the two binary synchronous sequences;
   a multiplexer unit for switching between the stored elements of each of the two sequences at a frequency equal to twice a predetermined carrier frequency to produce multiplexed signals representative of successive data symbols;
   means for logically combining the multiplexed signals with a square wave signal having a frequency equal to said carrier frequency of the quadrature phase-shift keyed signal; and
   means for generating a spectrally shaped sinusoidal signal in response to the signals produced from the combinations of said multiplexed and square wave signals.

7. The modulator of claim 6 wherein said logical combining means comprises exclusive-OR gates which receive said multiplexed signals and said square wave signal as respective input signals.

8. The modulator of claim 6 wherein said generating means is a finite impulse response filter.

9. The modulator of claim 8 wherein said filter comprises a plurality of weighted taps for each data symbol, means for successively connecting each tap with the output of said combining means at least once during each cycle of said square wave signal, and means for summing the signal from each connected tap to generate said sinusoidal signal.

10. The modulator of claim 6 wherein each data element of the binary synchronous sequences comprises two bits of information and said multiplexer unit produces a multiplexed signal from one of the two bits of each sequence, further including a second multiplexing unit for producing second multiplexed signals from the other bit of each sequence, means for generating information signals having values related to the data contained in said second multiplexed signals, and means for selectively modifying said information signals in response to said signal produced from the combinations of said multiplexed and square wave signals.

11. The modulator of claim 10 wherein said values of information signals are voltage levels, and said selective modifying means includes for altering the polarity of said information signal voltage levels.

12. Apparatus for quadrature amplitude modulating two binary synchronous sequences, comprising:
   means for storing at least one bit of each of the two binary synchronous sequences;
   a multiplexer unit for switching between the stored bits of each of the two sequences at a frequency equal to twice a predetermined carrier frequency to produce a multiplexed signal; and
   means for logically combining the multiplexed signal with a square wave signal having a frequency equal to said carrier frequency of the quadrature amplitude modulation.

13. The modulator of claim 12 wherein said logical combining means comprises an exclusive-OR gate which receives said multiplexed signal and said square wave signal as respective input signals.

14. Apparatus for quadrature amplitude modulation of two binary synchronous sequences each having at least two bits of information per data symbol, comprising:
   means for separately storing the two bits of information in a data symbol of each of the two binary sequences;
   a first multiplexer unit operating at a frequency equal to twice a predetermined carrier frequency to produce a first multiplexed signal from one stored bit of each of the two binary sequences;
   means for logically combining the first multiplexed signal with a square wave signal having a frequency equal to said carrier frequency of the quadrature amplitude modulation;
   a second multiplexer unit operating at a frequency equal to twice said predetermined carrier frequency to produce a second multiplexed signal from the other stored bit of each of the two binary sequences;
   means for generating an amplitude modulated signal in response to said second multiplexed signal; and
   means for selectively modifying the polarity of said amplitude modulated signal in response to said first multiplexed signal.

15. A method for quadrature amplitude modulation of a carrier signal with two binary synchronous sequences, comprising the steps of:
   storing plural successive bits of each of the two binary synchronous sequences;
   for each pair of stored bits comprised of one bit from each of the two sequences, sequentially sampling the two bits in a pair at a frequency twice the frequency of the carrier signal to produce plural multiplexed signals;
   logically combining each of the multiplexed signals with a square wave signal having a frequency equal to that of the carrier frequency of the quadrature amplitude modulation to produce plural modulated signals;
   weighting each modulated signal in accordance with a desired transfer function; and
   summing the weighted modulated signals.

16. The method of claim 15 wherein said logical combining step comprises modulo-2 addition of the square wave signal and each multiplexed signal.

17. The method of claim 15 further including the step of converting the modulated signals into an analog signal.

18. Apparatus for quadrature amplitude modulating two binary synchronous sequences, comprising:
   means for storing plural successive bits of each of the two binary synchronous sequences;
   a multiplexer unit for switching between corresponding stored bits of each of the two sequences at a frequency equal to twice a predetermined carrier frequency to produce plural multiplexed signals;
   means for logically combining the multiplexed signals with a square wave signal having a frequency equal to said carrier frequency of the quadrature amplitude modulation to produce plural modulated signals;
   means for weighting each of the modulated signals in accordance with a desired transfer function; and
   means for summing the weighted modulated signals.

19. The modulator of claim 18 wherein said logical combining means comprises exclusive-OR gates each of which receives one of said multiplexed signals and said square wave signal as respective input signals.

20. The modulator of claim 18 further including means for converting the modulated signals into an analog signal.

* * * * *